United States Patent
Lemma et al.

(10) Patent No.: US 11,009,009 B2
(45) Date of Patent: May 18, 2021

(54) SHAFT FOR A WIND TURBINE

(71) Applicant: Siemens Gamesa Renewable Energy A/S, Brande (DK)

(72) Inventors: Edom Lemma, Vejle (DK); Claus Michaelsen, Herning (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 3 days.

(21) Appl. No.: 16/114,547

(22) Filed: Aug. 28, 2018

(65) Prior Publication Data

US 2019/0072080 A1 Mar. 7, 2019

(30) Foreign Application Priority Data

Sep. 4, 2017 (EP) .................... 17189237

(51) Int. Cl.
| | | |
|---|---|---|
| F03D 15/00 | (2016.01) | |
| F03D 80/70 | (2016.01) | |
| F03D 13/10 | (2016.01) | |
| F16C 3/02 | (2006.01) | |

(52) U.S. Cl.
CPC ............ *F03D 15/00* (2016.05); *F03D 13/10* (2016.05); *F03D 80/70* (2016.05); *F16C 3/023* (2013.01); *F05B 2230/60* (2013.01); *F05B 2240/40* (2013.01); *F05B 2240/61* (2013.01); *F05B 2260/301* (2013.01); *F05B 2260/40* (2013.01);
(Continued)

(58) Field of Classification Search
CPC .......... F03D 15/20; F03D 80/70; F03D 15/00; F05B 2240/40; F05B 2240/60; F05B 2240/61; F05B 2260/301; F05B 2260/40; F16C 3/023; F16C 2260/60; F16C 2360/31; F16C 3/10; F16C 2260/50; Y10T 29/49947; Y10T 29/49963
See application file for complete search history.

(56) References Cited

U.S. PATENT DOCUMENTS 7,084,522 B2 * 8/2006 Wobben .................. F03D 1/065
290/55
8,508,064 B2 * 8/2013 Lauke ..................... F03D 1/065
290/55
(Continued)

FOREIGN PATENT DOCUMENTS

CN 101595299 A 12/2009
CN 201963465 U 9/2011
(Continued)

OTHER PUBLICATIONS

English Translation of Chinese Office Action for Application No. 201811026028.7, dated Oct. 16, 2019.
(Continued)

*Primary Examiner* — Courtney D Heinle
*Assistant Examiner* — Maxime M Adjagbe
(74) *Attorney, Agent, or Firm* — Schmeiser, Olsen & Watts LLP

(57) ABSTRACT

A wind turbine includes a main shaft rotatable around a rotation axis. The main shaft includes a first piece axially extending along the rotation axis, at least a second piece axially extending along the rotation axis, the second piece being axially adjacent to the first piece, a plurality of connections for fixing the second piece to the first piece.

13 Claims, 3 Drawing Sheets

(52) U.S. Cl.
CPC ... *F05B 2280/1011* (2013.01); *F16C 2226/60* (2013.01); *F16C 2360/31* (2013.01)

(56) References Cited

U.S. PATENT DOCUMENTS

| | | | |
|---|---|---|---|
| 8,618,689 B2 * | 12/2013 | Casazza | F03D 80/88 |
| | | | 290/55 |
| 2004/0108733 A1 | 6/2004 | Wobben | |
| 2007/0265133 A1 | 11/2007 | Smook | |
| 2009/0285693 A1 | 11/2009 | Bech | |
| 2010/0219642 A1 | 9/2010 | Kim et al. | |
| 2013/0076042 A1 | 3/2013 | Amano et al. | |
| 2014/0154077 A1 * | 6/2014 | Castell Martinez | F03D 1/0691 |
| | | | 416/170 R |

FOREIGN PATENT DOCUMENTS

| | | | |
|---|---|---|---|
| EP | 2592162 | A2 | 5/2013 |
| EP | 2740934 | A1 | 6/2014 |
| ES | 2377697 | A1 | 3/2012 |

OTHER PUBLICATIONS

Chinese Office Action for Application No. 201811026028.7, dated Oct. 20, 2020.

* cited by examiner

SHAFT FOR A WIND TURBINE

CROSS-REFERENCE TO RELATED APPLICATIONS

This application claims priority to European application No. EP17189237 having a filing date of Sep. 4, 2017, the entire contents of which are hereby incorporated by reference.

FIELD OF TECHNOLOGY

The following relates to a shaft of great dimensions, in particular for a wind turbine. Particularly, but not exclusively, the present invention may be efficiently applied to the main shaft of a wind turbine of considerable dimensions.

BACKGROUND

In the technical field of wind turbines, components are getting larger and larger. In particular, this is true for the main shaft of the wind turbine.

It is for example known to build main shaft for wind turbines, which may reach eight or more meters of length, four or more meters of diameter and approximately 80 tons of weight.

The main shaft of a wind turbine may be manufactured by casting. However, only few manufactured exists, who can cast a single object of the dimensions above specified. An alternative could be manufacturing the shaft by forging, which however determines much higher costs.

Therefore, there is still a need to provide an improved design and method for the manufacturing of the main shaft of a wind turbine, which avoid the above described inconveniences at the same time providing to the shaft the required specifications, particularly in terms of fatigue and wear resistance.

SUMMARY

According to a first aspect of embodiments of the present invention, it is provided a main shaft for a wind turbine axially extending along a rotation axis, the main shaft comprising:
  a first piece axially extending along the rotation axis,
  at least a second piece axially extending along the rotation axis, the second piece being axially adjacent to the first piece,
  a plurality of connections for fixing the second piece to the first piece.

According to a second aspect of embodiments of the invention, it is provided a wind turbine including the above described main shaft.

According to a third aspect of embodiments of the invention, it is provided a method of manufacturing a main shaft for a wind turbine axially extending along a rotation axis, the method comprising:
  manufacturing an first axially extended piece of the main shaft,
  manufacturing at least a second axially extended piece of the main shaft,
  fixing the second piece to the first piece though a plurality of connections in such a way that the second piece is axially adjacent to the first piece along the rotation axis.

Advantageously, the shaft is divided in two or more pieces joined together by means of connection. Each of the pieces is smaller and could be produced by casting by a plurality of manufacturers, without involving high costs and therefore solving the above mentioned problem.

In particular, according to embodiments of the invention, the plurality of connections may comprise a plurality of studs or of screw or of bolts, applied to a first flange of the first piece and/or to a second flange of the second piece.

According to other embodiments of the invention, one of the first flange and the second flange extends from a circumferential wall of the respective first piece or second piece radially outward with respect to the rotation axis and the other of the first flange and the second flange extends from a circumferential wall of the respective first piece or second piece radially inward with respect to the rotation axis. In particular, at least a connection may be provided between one of the first flange end and the second flange end and, respectively, the circumferential wall of the second piece or of the first piece.

Advantageously, such type of connection provides a good fatigue resistance.

According to further embodiments of the invention, the main shaft further comprises:
  at least a third piece axially extending along the rotation axis, the third piece being axially adjacent to the second piece,
  a plurality of connections for fixing the third piece to the second piece.

Particularly, the first piece and the third piece of the main shaft may be connected to a nacelle of the wind turbine the wind turbine through two rotational bearings.

According to possible embodiments of the present invention, the first and the third piece of the main shaft are forged, while the second in-between piece is cast. Having forged ends, where the bearings are connected to the main shaft, provides the following advantages:
  providing at the forged ends the surface hardness required for running sliding bearing, which is not met with cast iron in its pure form.
  nodule sizes of cast iron that can be manufacture at the size of the shaft end pieces would not be suitable for running sliding bearing,
  providing at the forged ends the surface hardness required for the seal running surface, which needs to be hard in order to fulfill wear resistance on shaft.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter, also any combination between features relating to different subject matters, in particular between features of the apparatus type claims and features of the method type claims, is considered as to be disclosed with this application.

The aspects defined above and further aspects of the embodiments of present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members wherein.

DETAILED DESCRIPTION

Figure 1:
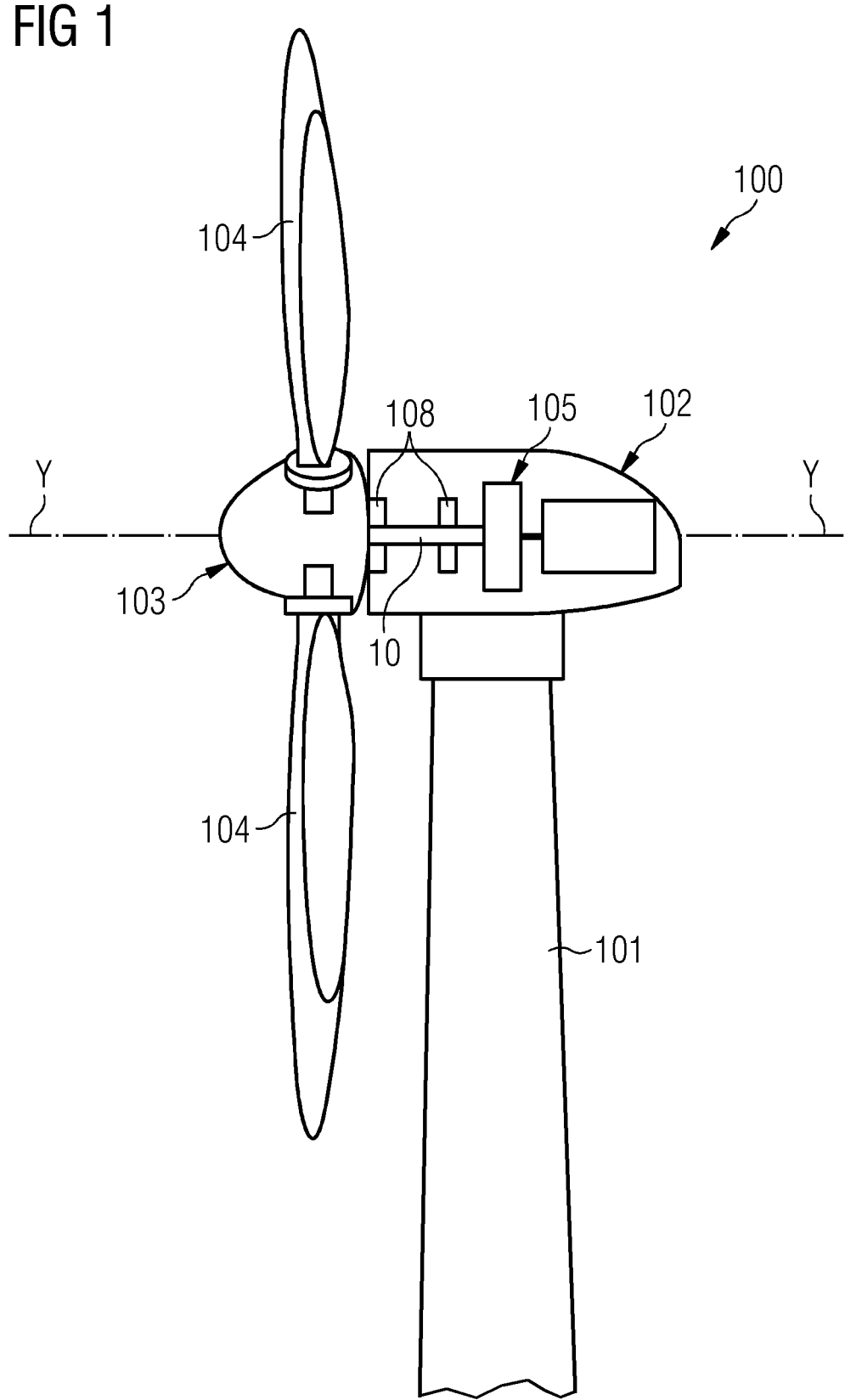
FIG. 1 shows a wind turbine comprising a main shaft with embodiments of the invention.

The illustrations in the drawings are schematic. It is noted that in different figures, similar or identical elements are provided with the same reference signs.

FIG. 1 shows a wind turbine 100 according to the invention. The wind turbine 100 comprises a tower 101, which is mounted on a non-depicted fundament. A nacelle 102 is arranged on top of the tower 101.

The wind turbine 100 further comprises a wind rotor 103 having three blades 104 (in the perspective of FIG. 1 only two blades 104 are visible). The wind rotor 103 is rotatable around a rotational axis Y. When not differently specified, the terms axial, radial and circumferential in the following are made with reference to the rotational axis Y.

The blades 104 extend radially with respect to the rotational axis Y.

The wind turbine 100 comprises an electric generator arrangement 105, which is not a specific part of the present invention and therefore not described in further details.

The wind rotor 103 is rotationally coupled with the electric generator arrangement 105 by means of a rotatable main shaft 10. A schematically depicted bearing assembly 108 is provided in order to hold in place the rotor 103. In particular, sliding bearings 108 may be used. The rotatable main shaft 10 extends along the rotational axis Y.

According to the present invention, the main shaft 10 comprises:
- a first piece 11 axially extending along the rotation axis Y,
- at least a second piece 12 axially extending along the rotation axis Y, the second piece 12 being axially adjacent to the first piece 11,
- a plurality of connections 15 for fixing the second piece 12 to the first piece 11.

The plurality of connections 15 are distributed around the rotation axis Y. In particular, connections 15 may be regularly distributed around the rotation axis Y.

Figure 2:
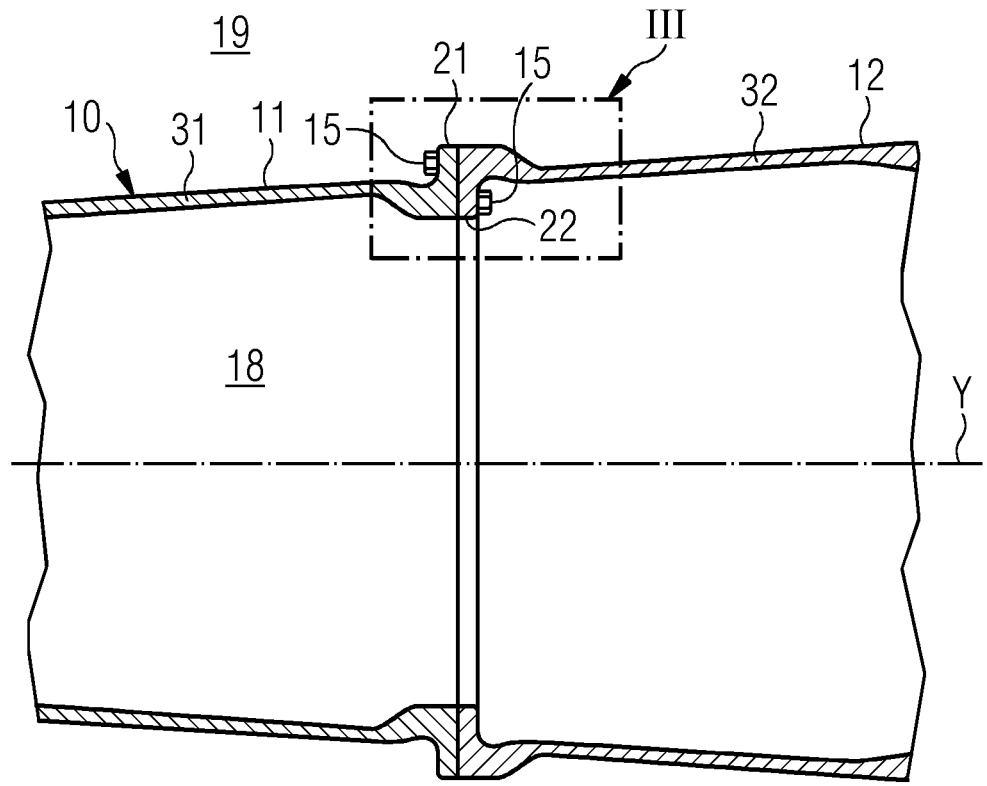
FIG. 2 shows a schematic longitudinal section of a main shaft for a wind turbine with an embodiment of the invention.
Figure 3:
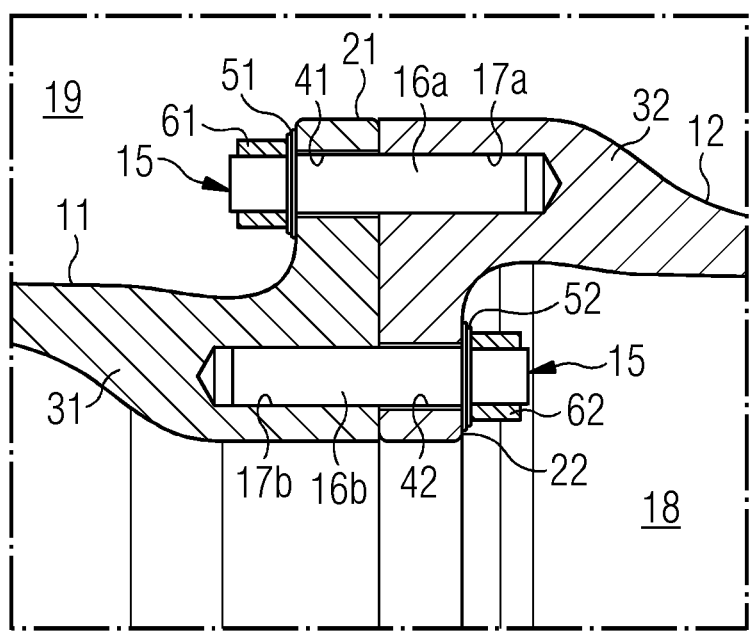
FIG. 3 shows a magnified view of detail III of FIG. 2.

FIGS. 2 and 3 show a first embodiment of the main shaft 10.

The main shaft 10 is hollow, being circumferentially delimited by a circumferential wall 31, 32, in particular a cylindrical wall. The circumferential wall 31, 32 of the main shaft 10 defines an inside 18 of the main shaft 10, extending radially from the rotation axis Y to the circumferential wall 31, 32, and an outside 19 of the main shaft 10, extending radially outwardly from the circumferential wall.

Each of the first piece 11 and the second piece 12 comprises a respective portion 31, 32 of the circumferential wall.

The first piece 11 and the second piece 12 further comprise respectively a first flange 21 and a second flange 22, to which the plurality of connections 15 are applied.

The first flange 21 extends from the circumferential wall 31 of the first piece 11 radially outward towards the outside 19 of the main shaft 10. The second flange 22 extends from the circumferential wall 32 of the second piece 12 radially inward towards the inside 18 of the main shaft 10.

The plurality of connections 15 comprises a plurality of axially oriented studs 16a, 16b. A portion 16a of the plurality of studs 16a, 16b is connected on the outside 19 of the main shaft 10. Each stud 16a is screwed in a respective axial thread 17a provided on the circumferential wall 32 of the second piece 12 and crosses a respective through hole 41 provided on the first flange 21 of the first piece 11. The stud 16a is fastened to the first flange 21 with a respective washer 51 and a respective nut 61. Each washer 51 and each nut 61 protrudes from the circumferential wall 31 of the first piece 11 towards the outside 19 of the main shaft 10.

Each stud 16b is screwed in a respective axial thread 17b provided on the circumferential wall 31 of the first piece 11 and crosses a respective throughhole 42 provided on the second flange 22 of the second piece 12. The stud 16b is fastened to the first flange 22 with a respective washer 52 and a respective nut 62. Each washer 52 and each nut 62 protrudes from the circumferential wall 32 of the second piece 12 towards the inside 18 of the main shaft 10.

Having plurality of connections 15 both on the inside 18 and on the outside 19 of the main shaft 10 assure a good connection between the first piece 11 and the second piece of the main shaft 10, in particular when the main shaft 10 bends.

As an alternative, according to other embodiments of the invention (not shown), instead or together the plurality of studs 16a, 16b, a plurality of screw and/or bolts may be used.

In the embodiment of FIGS. 2 and 3 each of the first piece 11 or the second piece 12 of the main shaft 10 may be cast or forged.

According to further embodiments of the invention (not shown) each of the first flange 21 and the second flange 22 may extend radially inward or outward. In particular, the first flange 21 and the second flange 22 may both extend radially inward or radially outward, the flanges 21, 22 being connected by respective connections 15 (stud, screw or bolt). More in particular both the first flange 21 and the second flange 22 may have a portion extending radially inward and another portion extending radially outward, each pair of inward portions and outward portion of the flanges 21, 22 being connected by respective connections 15 (stud, screw or bolt).

Figure 4:
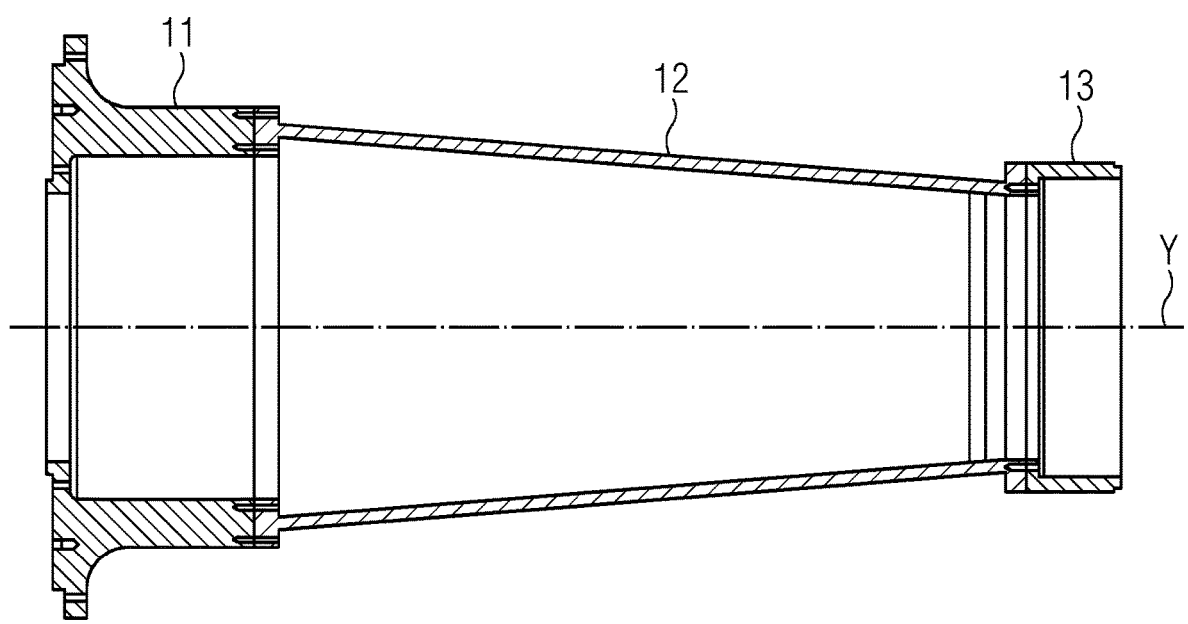
FIG. 4 shows a schematic longitudinal section of a main shaft for a wind turbine with another embodiment of the invention.

FIG. 4 shows a second embodiment of the main shaft 10. With respect to the first embodiment of FIGS. 2 and 3, in such second embodiment, the main shaft 10 comprises a third piece 13 axially extending along the rotation axis Y. The third piece 13 is axially adjacent to the second piece 12. A plurality of connections 15 are provided for fixing the third piece 13 to the second piece 12. Also at the interface between the second piece 12 and the third piece 13, the plurality of connections 15 are distributed around the rotation axis Y. In particular, connections 15 may be regularly distributed around the rotation axis Y.

Two rotational bearings 108 respectively connects the first piece 11 and the third piece 13 of the main shaft 10 to a nacelle 102 of the wind turbine 100, thus providing support to the main shaft 10 and allowing the main shaft 10 to rotate around the rotational axis Y. The first piece 11 and the third piece 13 are made of forged iron, while the second interposed piece 12, connecting the first piece 11 and the third piece 13 is made of cast iron.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine including a main shaft rotatable around a rotation axis, the main shaft comprising:
   a first piece axially extending along the rotation axis,
   at least a second piece axially extending along the rotation axis, the second piece being axially adjacent to the first piece,
   a plurality of connections for fixing the second piece to the first piece,
   wherein the first piece and second piece are not part of a wind rotor of the wind turbine, and are not part of a generator assembly of the wind turbine,
   wherein the plurality of connections are applied to at least one of a first flange of the first piece and a second flange of the second piece, wherein each of the first flange and the second flange have a through hole for extending at least one of the plurality of connections therethrough, said plurality of connections terminating within a circumferential wall of the respective first or second piece, and
   wherein one of the first flange and the second flange extends from the circumferential wall of the respective first piece or second piece radially outward with respect to the rotation axis and the other of the first flange and the second flange extends from a circumferential wall of the respective first piece or second piece radially inward with respect to the rotation axis.

2. The wind turbine as claimed in claim 1, wherein the plurality of connections comprises a plurality of studs or of screws or of bolts.

3. The wind turbine as claimed in claim 1, wherein at least one connection of the plurality of connections is provided between one of the first flange end and the second flange end and, respectively, the circumferential wall of the second piece or the first piece.

4. The wind turbine as claimed in claim 1, wherein the plurality of connections are distributed around the rotation axis.

5. The wind turbine as claimed in claim 1, wherein the main shaft further comprises:
   at least a third piece axially extending along the rotation axis, the third piece being axially adjacent to the second piece,
   a plurality of connections for fixing the third piece to the second piece.

6. The wind turbine as claimed in claim 5, wherein the wind turbine further comprises two rotational bearings respectively about the first piece and the third piece of the main shaft of the wind turbine.

7. A main shaft for a wind turbine axially extending along a rotation axis, the main shaft comprising:
   a first piece axially extending along the rotation axis,
   at least a second piece axially extending along the rotation axis, the second piece being axially adjacent to the first piece,
   a plurality of connections for fixing the second piece to the first piece,
   wherein the first piece and second piece are not part of a wind rotor of the wind turbine, and are not part of a generator assembly of the wind turbine,
   wherein the plurality of connections are applied to at least one of a first flange of the first piece and a second flange of the second piece, wherein each of the first flange and the second flange have a through hole for extending at least one of the plurality of connections therethrough, said plurality of connections terminating within a circumferential wall of the respective first or second piece, and
   wherein one of the first flange and the second flange extends from the circumferential wall of the respective first piece or second piece radially outward with respect to the rotation axis and the other of the first flange and the second flange extends from a circumferential wall of the respective first piece or second piece radially inward with respect to the rotation axis.

8. The main shaft for a wind turbine as claimed in claim 7, wherein the main shaft further comprises:
   at least a third piece axially extending along the rotation axis, the third piece being axially adjacent to the second piece,
   a plurality of connections for fixing the third piece to the second piece.

9. A method for manufacturing a main shaft for a wind turbine axially extending along a rotation axis, the method comprising:
   manufacturing a first axially extended piece of the main shaft,
   manufacturing at least a second axially extended piece of the main shaft,
   wherein the first axially extended piece of the main shaft and the at least a second axially extended piece of the main shaft are not part of a wind rotor of the wind turbine, and are not part of a generator assembly of the wind turbine,
   fixing the second piece to the first piece through a plurality of connections in such a way that the second piece is axially adjacent to the first piece along the rotation axis,
   wherein the plurality of connections are applied to at least one of a first flange of the first piece and a second flange of the second piece,
   extending the plurality of connections through a through hole in each of the first flange and the second flange,
   terminating each of said plurality of connections within a circumferential wall of the respective first or second piece, and
   wherein one of the first flange and the second flange extends from the circumferential wall of the respective first piece or second piece radially outward with respect to the rotation axis and the other of the first flange and the second flange extends from a circumferential wall of the respective first piece or second piece radially inward with respect to the rotation axis.

10. The method as claimed in claim 9, wherein at least one of the first piece and the second piece are made of cast iron.

11. A method for manufacturing a main shaft for a wind turbine axially extending along a rotation axis, the method comprising:
   manufacturing at least a third axially extended piece of the main shaft,
   fixing the third piece to a second piece through a plurality of connections in such a way that the third piece is axially adjacent to the second piece,
   fixing a first piece to the second piece, and
   wherein the first and the third piece of the main shaft are forged, while the second, in-between, piece is cast.

12. A wind turbine including a main shaft rotatable around a rotation axis, the main shaft comprising:
   a first piece axially extending along the rotation axis;

at least a second piece axially extending along the rotation axis, the second piece being axially adjacent to the first piece, wherein the first piece and second piece are not part of a wind rotor of the wind turbine, and are not part of a generator assembly of the wind turbine;

a first plurality of connections for fixing the second piece to the first piece;

a second plurality of connections for fixing the second piece to the first piece; and a hollow inside, wherein the first plurality of connections and second plurality of connections are applied to at least one of a first flange of the first piece and a second flange of the second piece, wherein each of the first flange and the second flange have a through hole for extending at least one of the first plurality of connections and second plurality of connections therethrough, said first plurality of connections and second plurality of connections terminating within a circumferential wall of the respective first or second piece, wherein one of the first flange and the second flange extends from the circumferential wall of the respective first piece or second piece radially outward with respect to the rotation axis and the other of the first flange and the second flange extends from a circumferential wall of the respective first piece or second piece radially inward with respect to the rotation axis, and wherein the first plurality of connections extend into the hollow inside of the main shaft and the second plurality of connections are outside of the hollow inside of the main shaft.

13. A wind turbine including a main shaft rotatable around a rotation axis, the main shaft comprising:

a first piece axially extending along the rotation axis;

a second piece axially extending along the rotation axis, the second piece being axially adjacent to the first piece;

a third piece axially extending along the rotation axis, the third piece being axially adjacent to the second piece; and a plurality of connections for fixing the third piece to the second piece, wherein the first piece and the third piece of the main shaft are forged, and the second, in between piece, is cast.

* * * * *